United States Patent [19]
Tuli

[11] Patent Number: 6,003,034
[45] Date of Patent: *Dec. 14, 1999

[54] LINKING OF MULTIPLE ICONS TO DATA UNITS

[76] Inventor: Raja Singh Tuli, 55 City Centre Drive, Suite 500, Mississauga, Ontario, Canada, L5B 1M3

[ * ] Notice: This patent is subject to a terminal disclaimer.

[21] Appl. No.: 08/442,326

[22] Filed: May 16, 1995

[51] Int. Cl.$^6$ .................................................. G06F 17/30
[52] U.S. Cl. ............................................ 707/101; 707/205
[58] Field of Search ................................... 395/603, 604, 395/605; 707/101, 205

[56] References Cited

U.S. PATENT DOCUMENTS

| | | | |
|---|---|---|---|
| 5,317,732 | 5/1994 | Gerlach, Jr. et al. | 707/200 |
| 5,421,008 | 5/1995 | Banning et al. | 395/600 |
| 5,428,734 | 6/1995 | Haynes et al. | 395/159 |
| 5,428,776 | 6/1995 | Rothfield | 395/600 |
| 5,485,567 | 1/1996 | Banning et al. | 395/148 |
| 5,515,488 | 5/1996 | Hoppe et al. | 395/140 |
| 5,721,912 | 2/1998 | Stepczyk et al. | 707/102 |
| 5,787,432 | 7/1998 | LeTourneau | 707/101 |

OTHER PUBLICATIONS

Lee et al., "Query by image conten using multiple objects and multiple features", IEEE, pp. 76–80, Nov. 13,1990.

Yoshitaka et al., "Iconic object definition system for object–oriented databases", IEEE, pp. 169–177, Aug. 24, 1993.

Mohan et al., "A visual query language for graphical interaction with schema–intensive databases", IEEE, pp. 843–858, Oct. 1993.

Massari et al., "An iconic query system with intensional feedback", IEEE, pp. 386–388, Aug. 24, 1993.

Catarci et al., "Iconic and diagrammatic interfaces: an integrated approach", IEEE, pp. 199–204, Oct. 8, 1991.

Lam et al., "A graphical interface for an object oriented query language", IEEE, pp. 231–237, Oct. 31, 1990.

Tsuda et al., "IconicBrowser: an iconic retrieval system for object oriented databases", IEEE, pp. 130–137, Oct. 4,1989.

Echeverria et al., "An intuitive approach for the expression of Boolean queries", IEEE, pp. 118–123, Oct. 4, 1989.

Rohr, "Graphical user languages for querying information", IEEE, pp. 21–28, Oct. 10, 1988.

*Primary Examiner*—Thomas G. Black
*Assistant Examiner*—Charles L. Rones

[57] ABSTRACT

A simplified method of file management which assigns many related attributes to any file created by conventional software application programs, with the ability to retrieve any file or a list of such files belonging to any attribute is provided. Software objects are represented by icons, whereby these icons represent topics about which each file is related and upon performing various graphical query searches using the mathematical theory of intersecting sets for desired files, a list of all files appears in a window. When commands like "save", "save as" or open file" are executed, icons and (or) groups of icons appear in a data base window and any icon can be selected related to the file. Hard links exist enabling a predetermined chain of groups or categories to be linked with any file saved, enabling a more elaborate data base system.

18 Claims, 16 Drawing Sheets

FIG. 16

LINKING OF MULTIPLE ICONS TO DATA UNITS

BACKGROUND OF THE INVENTION

The present invention relates to a method for developing a file management system for personal computers or networks which utilizes an object oriented approach for storing and retrieving information. The heart of the invention lies in implementing multiple attributes to all files enabling the retrieval of any file through any one or more of its attributes. The file management software works in collaboration with common software applications and is launched automatically when specific commands, such as "save" are executed from inside the application program, enabling the operator to input or edit attributes at this time. A new appearance to the operating system's desk top is provided enabling rapid access to any desired file by selecting attributes from various categories that appear in dedicated windows.

Prior art would involve directory systems which consist of files and directories with the ability to organize particular files into a dedicated directory and also directories into other directories. Compared with the present invention, conventional file management systems allocate very few attributes to a file, usually the name, date and the program that created it, making it very difficult to retrieve a particular file if one or more attributes are forgotten as the path through directories must be remembered. The present device would make an extremely efficient and resourceful data base system with numerous avenues to retrieve any file. Prior art would also extend to Data Base Management Systems.

Useful and practical applications for the present invention would involve file managers and data base systems commonly used in personal computers and networks. The system itself could be used as a data base to store records, since each attribute can be a record and not linked to any file in different applications.

SUMMARY OF THE INVENTION

In a principle aspect of the present invention, a simplified file manager through a data base system which assigns many related attributes to any file created by conventional software application programs, with the ability to retrieve any file or a list of such files belonging to any attribute is provided. A mathematical approach utilizing the theory of intersecting sets is employed, employing a combination of "and's" and "or's" to access files, since all categories of subjects represent sets of files. These sets and their interrelationships are commonly illustrated by Venn diagrams.

In a further aspect of the present invention, software objects are represented by icons on the computer's monitor whereby these icons represent topics about which each file is related. Icons are created from the main menu and placed into categories called group windows that appear on the desk top of the monitor. It is possible to pan through each group window allowing many icons to be placed there, with the feature of nesting group windows inside group windows. Icons vary from each other in size, shape, and attributes and can also be placed inside the desk top outside the group windows. There are many categories or group windows which can be relevant to a particular file, in which case icons within these group windows would be selected to identify any file, otherwise a new group window or new icons can be created to better address that particular file. The main menu is equipped with a variety of selections to enable the user to create and modify new icons on the screen or inside a group window, and also select icons from an existing library or scan in new icons. An icon, which represents a discrete set of files, could be in the form of a shape that resembles a topic or simply a name that appears on the screen. There are standard groups of topics or attributes which icons represent such as "authors", "names", "date", "version", "departments", "project", etc. Icons can also represent topics such as tones which can be happy, sad, angry, etc. In searching for a particular file or group of files belonging to a particular category, icons from each group window that are only related to those desired files are selected and a copy placed into the "query area" window without moving the original icons, by simply dragging the selected icons out of their group windows into the "query area". Icons can also be moved, duplicated and edited inside each group window. Multiple icons may be selected in any group window, or none at all, and when dragged into the "query area", copies of multiple icons from each group window consolidate into one group icon in the "query area". Upon performing various graphical query searches using the mathematical theory of intersecting sets for desired files, a list of all such files appear in a "list of files" window.

The software object which is a collection of functions and data may or may not be represented by an icon. Various objects exist, the simplest of which is data displaying the name of the icon. Usually this object is represented by an icon on the screen, but not always, as sometimes there is no icon associated with it. Hence, under the "name" group window, there could exist many names of files but not necessarily icons for each file, as icons consume memory and are not particularly useful here. A more sophisticated object exists with a name and an icon represented as a certain shape with more information pertaining to its location, date, position in a particular group, etc. However, most objects have an icon and a name under it and can be linked to one or more files, or none at all, and the information to which files are linked to may or may not be in that object's data.

The user's software application programs run as usual, but upon executing specific command functions like "save", "save as", or "open file", the data base window of the invention appears on the screen or alternatively by accessing the main operating system's desk top menu functions, where most attributes can be edited at this time. When these commands are executed, icons and or groups of icons appear in the data base window at which time any icon can be selected that relates to that file, if that file has not been saved under this software before. Usually this means selecting one or more icons from each group window pertaining only to that file. Selecting an icon by clicking on it with a mouse alters its appearance to notify the user that it has been selected. When saving a file that has already been saved before under this software, icons that have already been selected appear in this window at which time icons pertaining to that file can be added or removed if desired.

Creating a new icon from the main menu of the desk top window is possible, to better define a discrete set of files. A dialogue box or window appears upon selecting "create new icon" from the main menu allowing the user to input important parameters such as the "title", the "name", and the "position" of this new icon. A library of icons is available to select the desired shape of the new icon and it is also possible to scan new shapes into the library, with the ability to edit and custom design any icon. Programs can be inputted from within the desk top window which are invoked when certain events occur such as "save as" or "open file" from within any application program, or when "OK" is invoked after selecting certain icons which represent a certain file.

To locate a specific file when on the desk top or by performing an "open" command from the "file" menu inside an application program, one or more icons from some or all group windows that relate only to that file can be selected and dragged into a "query area" window. Selecting more than one icon in a group window, by individually selecting and using the "shift" key or by dragging an area over the icon(s) with a mouse or other selecting methods, consolidates them into one group icon as they enter the "query area" window. A copy of each selected icon is moved to the "query area" window leaving the selected icons in their original position. Should two or more regular icons, group icons, or combinations thereof be moved into the "query area" window with a portion of one icon overlapping the other, the operator only has to select and invoke that overlapping portion by double clicking on it with a mouse, and all files with attributes common to icons selected in the group windows are displayed in a "list of files" window which appears on the screen. The operator is now left with very few files to choose from amongst which the desired file exists. In this list of files are all the attributes of each file with each line containing all declared attributes of that file such as the "name", "author'", "project", "date", etc., and when a file is selected from this list, all icons related are automatically selected and editing can be performed at this time. The list of files window display can be conveniently arranged by a menu driven sort function for any column of attributes. Select options are available from the menu which present the user with useful features such as displaying all files within a certain date period, or only files belonging to specific authors, etc., and also the ability to view by icons associated with each attribute. All attributes refer to the names of all icons that the file is linked to. Selecting all the attributes of any file will locate that file only, as any two files can't have identical attributes, but all attributes need not be remembered or selected in retrieving a file, which makes this invention quite powerful as a data base or file manager. Any number of icons or group icons, which represent a set of discrete files, can be involved in the query function and by overlapping or placing adjacent to each other, the theory of sets using "and", "or" and other functions can be performed to do a variety of queries.

Some groups such as "name group", "date group" or "version group" can also be created by the user, and the user can dictate whether the objects inside these groups have icons. Usually these group windows do not have icons unlike main groups such as "project", "author", "subject", etc., but inside each group window need not necessarily contain icons themselves but only a listing of the names of these icons especially when there is a large quantity. It is advantageous to show the names of all files and not icon names in the "name group" which displays a listing of all file names, and only for this "name group" the names of the icons are the same as the file names. The name of a file is just another attribute that is linked to that file and normally each name refers to a separate file except when many versions of the same file exists. Other group windows exist such as "authors", in which the names of the authors are not the names of the files that they are linked to, as they represent many files. Names of each file could also represent several versions of the same file, hence several files can have the same name but different versions. A generic icon exists which has no shape but only a name and represents a software object which does not respond to any events. In the "name group" lies a sophisticated object called the "new generating name" icon which responds to one message. When a "save" command is executed from within the data base window, after selecting all attributes usually one in each group window, by clicking on the appropriate icons with a mouse and then naming the icon, that "save" message goes to this new generating name icon and the program that responds to that "save" message generates a new generic icon inside this group window and gives it the name that the user has inputted for this generic icon. Each icon has a name attached to it and can be edited by using a mouse. All listings of files or icons can be arranged in alphabetical order, reverse alphabetical order, numeric order, chronologically, size, and other useful representations. A "new generating date" icon also exists which is a standard object with more code in it that acts and responds similar to the "new generating name" icon, but this icon extracts the computer's clock date when "save" is executed from within the application program, and can automatically input it in a dedicated space which can be edited at any time, and also spawns a new icon in the "date group" with this selected date. The "new generating version" icon is also similar to the "new generating name" icon with the exception that it does not create a new version unless the available version numbers are used and there is a need to spawn a new version. Every time the user saves a file there is the option to keep the existing version number if one is assigned, or change to a higher number by selecting an available version number from the "version group" window. These are just some examples of sophisticated icons which can be created by the user to perform many tasks in the software program. There could be many other types of sophisticated icons which respond to messages that perform various other tasks such as network access, work flow systems, etc., all created by the user.

Another aspect of the program is that there exist "hard links". These links are set by the user to enable a pre determined chain of groups or categories to be linked with any file saved, enabling a more elaborate data base system. Hence, when the "save" command is executed in an application program, the data base window appears reminding the user to select and link files to icons as desired. Several different "hard link" routes can exist taking the user from "name" to "date" to "version", or from "name" to "author" to "project", or any other desired route, but once a "hard link" route is started it must be completed. The "hard links" prevent the user from exiting the data base window until completing any route as a means of ensuring sufficient attributes are selected in describing a file.

In comparison to conventional Data Base Management Systems of prior art, this invention is far more convenient and user friendly. Creating "customer" records 68 is usually done by conventional software on a separate table from "order" records 69 which are linked together as demonstrated in FIG. 14. The customer records contain important data such as "customer name", "phone #", "address", etc., arranged in columns with each row per customer. The order records contain "order #", "item purchased", "price", "customer name", etc. A primary key exists which is different for each line, hence the "customer name" 70 is the primary key for the customer records 68, and the "order #" 71 is the primary key for the order records 69 as they can't be repeated. A "foreign key" can exist for any file which corresponds to a primary key of another file. Hence, the "customer name" 72 is the foreign key for the order records 69 corresponding to the "customer name" 70 of the customer records 68. Spelling mistakes in the foreign key of the order records can lead to inputting erroneous customer names and poor tracking of previous orders. To perform specific file searches which involve determining how much a particular customer purchased during a desired period, etc., would be a difficult task and not a straightforward one. However, this task can be easily accomplished with the present invention having the data base window 73 of FIG. 15 set up to display group windows of "customer name" 74, "phone #" 75, "address" 76, "order #" 77, "items purchased" 78, "price" 79, and a "query area" window 80. One of the main advantages with this invention is the fact that all records are displayed at once in organized groups. New generating icons are available in the "customer name", "phone #", "address", "order #", and "price" group windows. To input a customer record, the user inputs the name in the new generating name icon in 74, the phone number in 75, and the address in 76 with the convenience of hard links 81 to ensure that all relevant information is inputted. To enter a new order, the user sees the last order number and can input a new one in 77 or the new generating order icon can create one, the items purchased can be selected by clicking on icons in 78, the price inputted in 79 and the customer selected from the existing customer name list or a new one inputted all with the convenience of hard links. Selecting a past customer from an available list by clicking on the name is particularly advantageous in eliminating errors if one were to type the name each time not to mention time saved. Another noteworthy advantage is that switching between customer record and order record tables whilst inputting data is not necessary, as all information is available in the same window. Hence, the burden of primary keys and foreign keys is eliminated with the architecture of the present invention. The main advantage of the invention is in query searches whereby it is possible to find virtually any information on customer purchases. The amount that any customer purchased of any item can be easily determined by dragging the customer from the customer name group into the query area window, dragging the item's icon into the query area overlapping the customer icon, and by double clicking on the overlapping portion a list of records 82 of FIG. 16 appears with all the relevant purchases, which could be added up using menu driven spreadsheet functions. More complicated searches can be performed to determine how many items between a particular price range did a customer purchase. By selecting all prices within this range from the price group window and moving them to the query area and crossing this price group icon with the particular customer in the query area, produces these results without the need to write any specific formulas as commonly done in spreadsheets.

BRIEF DESCRIPTION OF DRAWINGS

This invention maybe better understood and its numerous objects and advantages will become apparent to those skilled in the art by referring to the accompanying drawings as follows:

FIG. 16 illustrates a list of records produced by a query function as implemented by the present invention of FIG. 15.

DETAILED DESCRIPTION OF PREFERRED EMBODIMENTS

Figure 1:
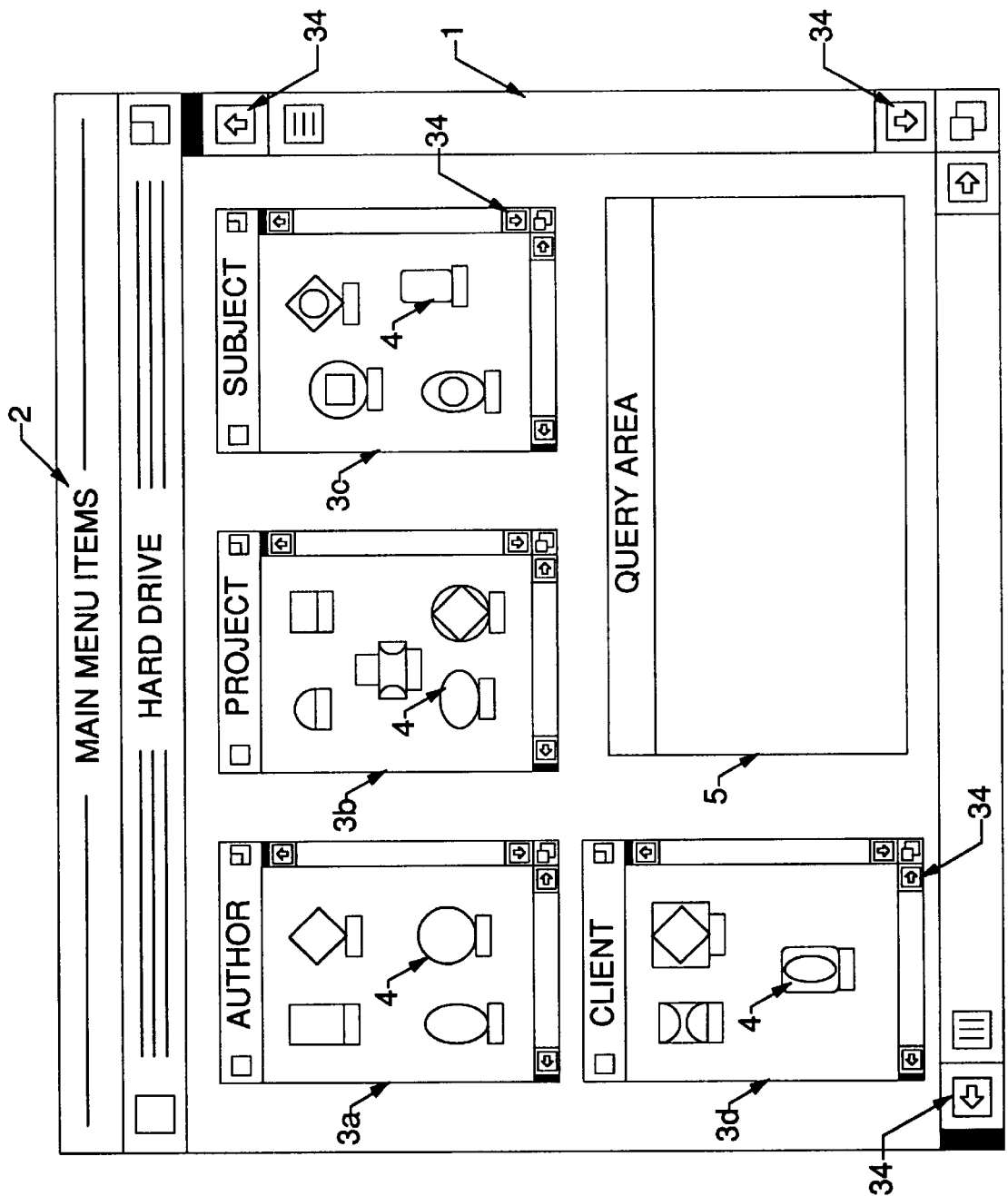
FIG. 1 is a schematic representation of the desk top or data base window, in accordance with the present invention.
Figure 13:
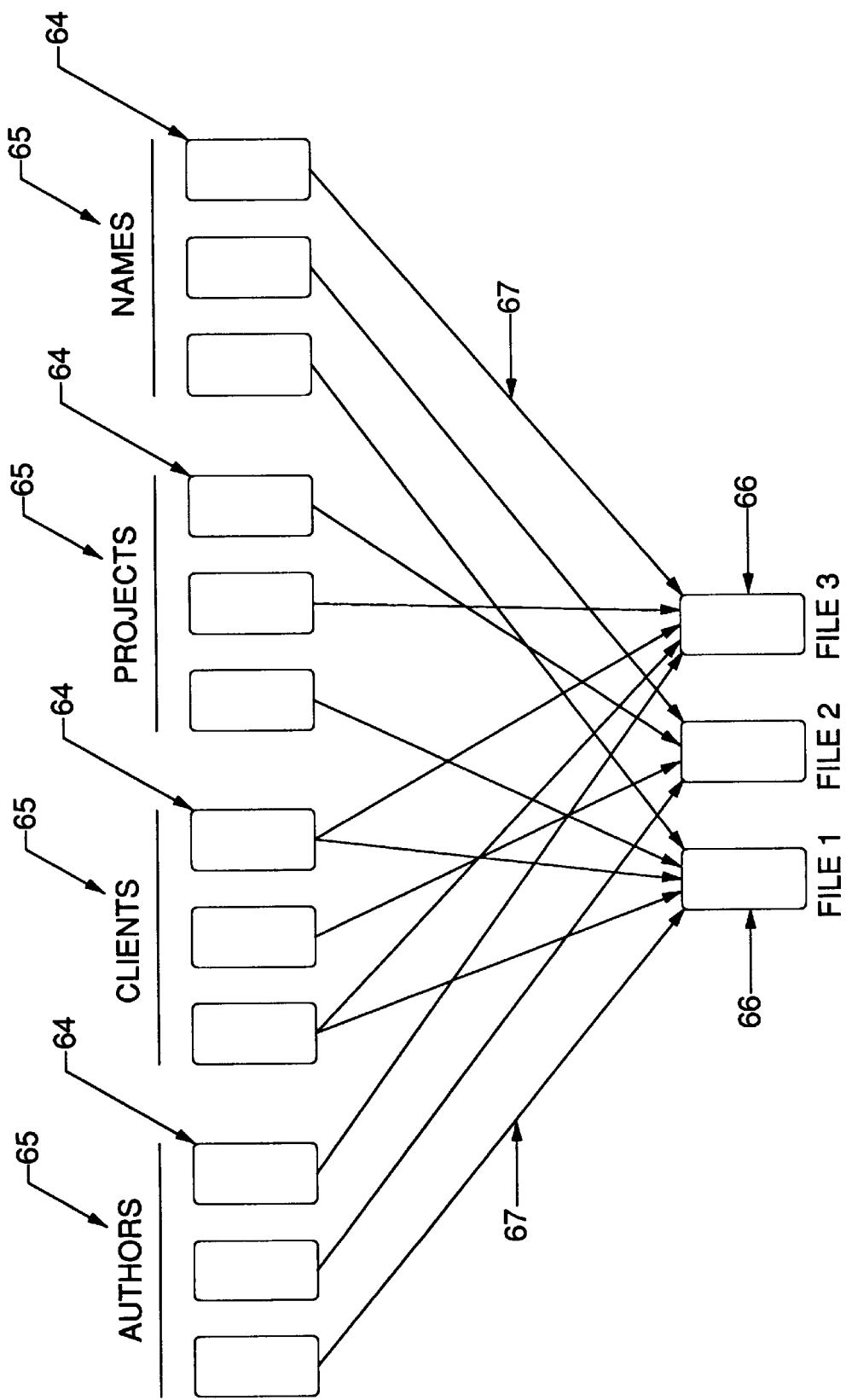
FIG. 13 illustrates the multiple linking of all software objects to various files, in accordance with the present invention.

For a better understanding of the invention, reference is first made to FIG. 1 which illustrates the layout of the "desk top" window 1 which is also referred to as the "data base" window, as seen on a computer's monitor. Main menu pull down items 2 are present to allow the user to perform specific command functions in creating, editing and modifying software objects, icons and program functions. Group windows 3a, 3b, 3c & 3d are present inside the desk top window, each named differently, defining main categories which are used in describing any particular file. Within each of these group windows lie software objects represented by icons 4 which represent topics about which each file is related. To further understand this concept, the tree diagram of FIG. 13 is used to demonstrate how objects can be linked to various files. Objects 64 belonging to specific categories or group windows 65 can be linked to any number of files 66 which are also objects. It is possible to link any file to more than one object in any particular category where applicable as illustrated by the paths or link lines 67. Icons vary from each other in size, shape and attributes, each of which represents a discrete set of files and could be in the form of a shape that resembles a topic or simply a name that appears on the screen. New icons can be created from commands found in the main menu, or they can be selected from a library of icons, or even scanned into the computer. Nesting of group windows inside group windows is also possible depending on individual methods of organization. Many icons can be placed inside any group window with the ability to pan through each window, since many windows may be present on the desk top limiting each window's size. Panning through any group window or the desk top of FIG. 1 is possible using conventional methods of clicking and dragging a mouse in the direction desired, or by using the panning arrows 34 at the outskirts. An icon can be linked to a single file or a discrete set of files, and can also exist outside a group window, where the icon could be in the form of a shape that resembles a topic, tone or simply a name. In searching for a particular file or group of files in a particular category, icons from each group window that are only related to those desired files are selected and a copy placed into the "query area" window 5 without moving the original icons. Icons can also be moved, duplicated and edited inside each group window. Multiple icons may be selected in any group window, or none at all, and when dragged into the "query area", copies of multiple icons from each group window consolidate into one group icon inside the "query area". Upon performing various query searches using the mathematical theory of sets for desired files, a list of all such files appear in a "list of files" window 6 of FIG. 6.

Figure 2:
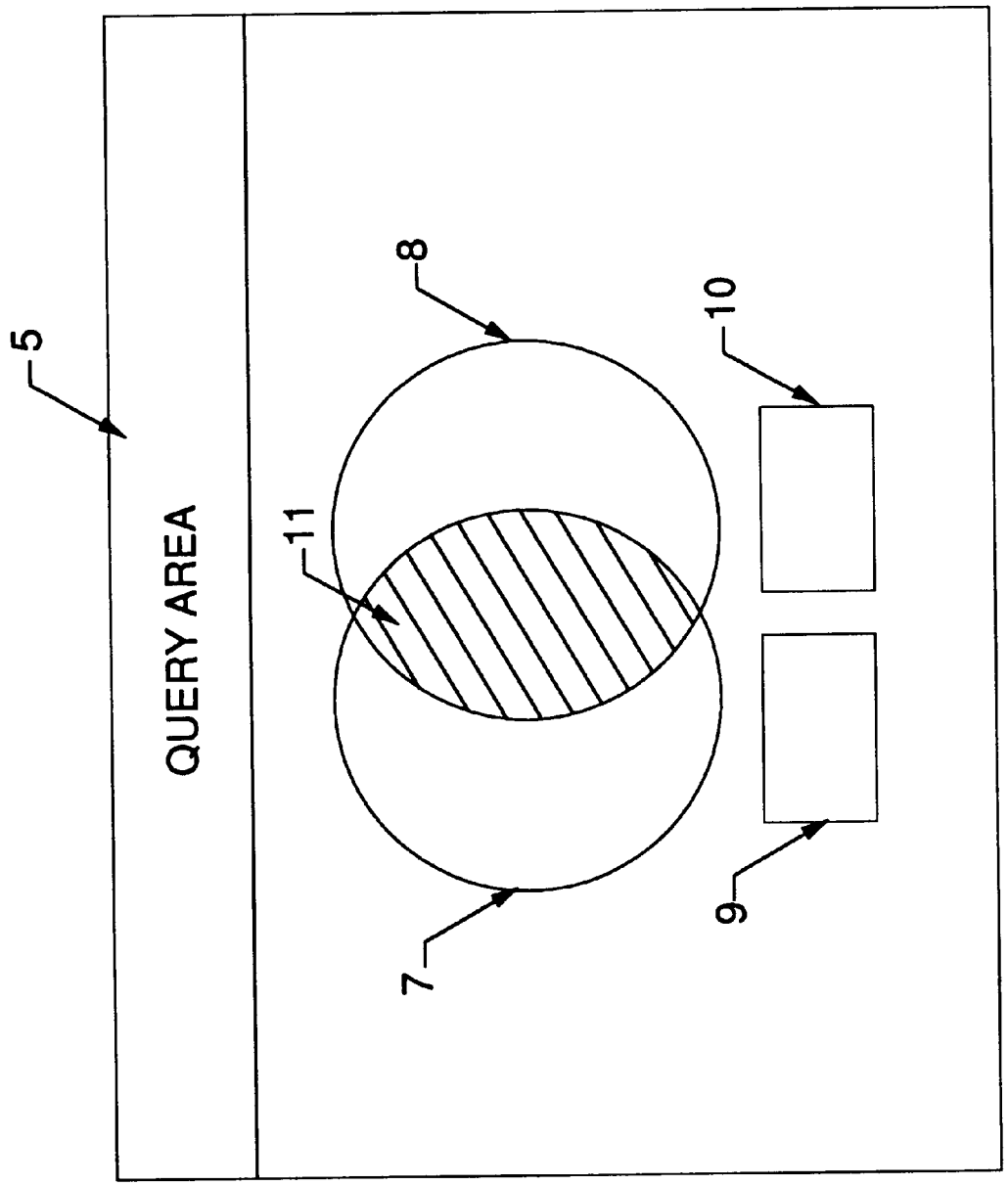
FIG. 2 is an enlarged illustration of the "query area" window of the desk top with two group icons intersecting each other in a Venn Diagram, in accordance with the present invention.

Referring to FIG. 2, the "query area" window 5 of FIG. 1 is shown to have two regular icons, group icons or combination thereof 7 & 8 represented as mathematical sets in a Venn Diagram. Sets and their interrelationships are often illustrated by such a Venn diagram. Group icons can also represent a single icon or multiple icons from one group window, only whereby titles 9 & 10 for consolidated multiple icons are automatically assigned to each group icon as they are dragged inside the "query area" window, and each title can be edited at any time. When group icons overlap each other, a shaded portion 11 appears as the common area, and when this common area is selected and the file search executed by double clicking on any part of the common area with a mouse or other selecting means, all such files common to both group icons appear in the "list of files" window 6 of FIG. 6 which appears on the monitor over the desk top window. Hence, all files common to sets of files 7 "and" 8 have been selected and displayed, as defined by the mathematical theory of sets. Executing a file search can also be invoked by a menu driven function when the common area is selected. Considering the scenario with reference to FIG. 2, whereby 7 represents a copy of the icon "project A" dragged from the "project group window" into the "query area" window 5, and 8 represents a copy of the icon "author B" also dragged from the "author group window" into the "query area" window, such that a common area 11 of "project A" overlaps "author B". When portion 11 is selected and the file search executed by double clicking on any part of this common area with a mouse or other selecting means, all files common to "project A" written by "author B" are displayed in the "list of files" window 6 of FIG. 6 which appears on the monitor over the desk top window. The titles of icons 7 and 8 are displayed as part of each icon in title boxes 9 and 10. The user may not always remember all vital parameters or attributes of each file which leads to another scenario still referring to FIG. 2 whereby the exact "project" is uncertain but "author B" is certain, in which case the user can search through many projects by this particular author. All suspected projects are selected in the "project" group window by clicking and dragging a mouse over these icons in this particular group window, and by clicking on any one selected icon and dragging it to the "query area" window 5, a copy of all selected "project" icons consolidate into a single "project" group icon 7 appropriately named in title box 9 inside the "query area" window. A copy of the icon 8 which represents "author B" is also dragged from the "author group window" into the "query area" window, such that a portion 11 of 7 overlaps 8. When portion 11 is selected and the file search executed by double clicking on any part of this common area with a mouse or other selecting means, all files common to all selected projects represented by "project" group icon 7 written by "author B" are displayed in the "list of files" window 6 of FIG. 6 which appears on the monitor over the desk top window. The "list of files" window can be closed at any time to reveal the desk top window of FIG. 1 stacked behind it.

Figure 3:
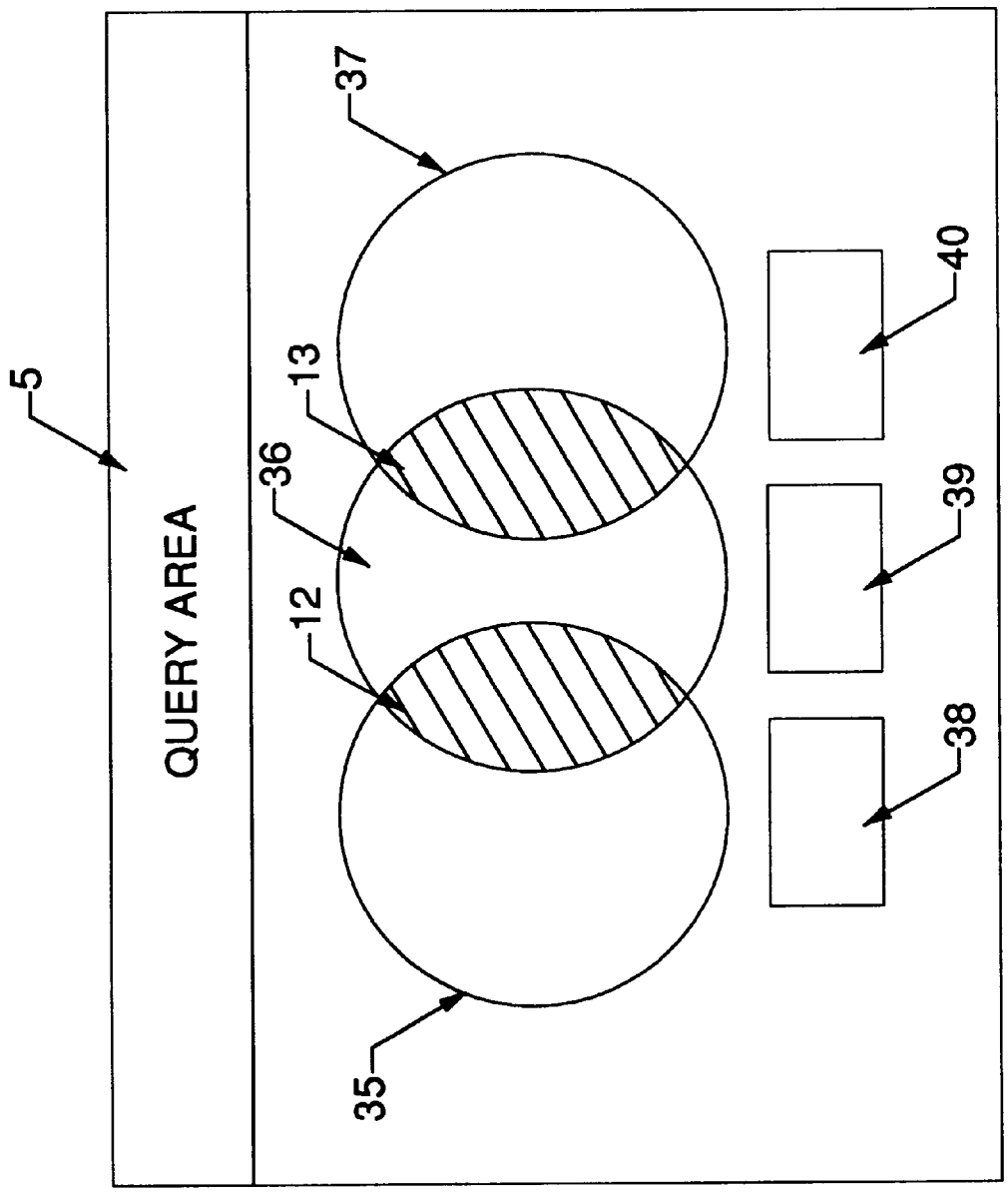
FIG. 3 is an enlarged illustration of the "query area" window of the desk top with three group icons in a Venn Diagram intersecting in a particular fashion with two specific selected common areas, in accordance with the present invention.

Referring now to FIG. 3, the "query area" window 5 of FIG. 1 is shown to have a copy of three group icons 35, 36 & 37, with respective titles in boxes 38, 39 & 40, demonstrating the fact that many group icons can be dragged into this window. Two shaded common overlapping areas 12 & 13 are present where icons 35 & 37 each overlap icon 36 and when both common areas are selected with a mouse, by selecting one common area and with the computer's "shift" key depressed the other common area is selected, the file search is executed by double clicking on any part of either common area, and all files common to {35 "and" 36} "or" {36 "and" 37} appear in the "list of files" window 6 of FIG. 6 which appears on the monitor over the desk top window. Hence, by linking each file on a computer system to various icons it is possible to retrieve these same files by addressing any of these icons. All related icons need not be remembered or addressed as this method will retrieve the file or group of files, as long as one or more icons are addressed. Considering the scenario with reference to FIG. 3, whereby 35 represents an icon titled "client C", 36 represents "project D", and 37 represents "client F". By selecting the first overlapping area 12 with a mouse on the monitor, and then selecting the second overlapping area 13 with the "shift" key depressed and double clicking on any of these overlapping areas to execute a file search, a list of files is produced for clients C & F belonging to project D in the "list of files" window 6 of FIG. 6 which appears on the monitor over the desk top window. For all scenarios cited, any "and" and "or" operation or combination thereof can be performed on any icon or groups of icons. The standard interpretation of the set diagram of FIG. 3 is described as {Client C "and" Project D} "or" {Project D "and" Client F}.

Figure 4:
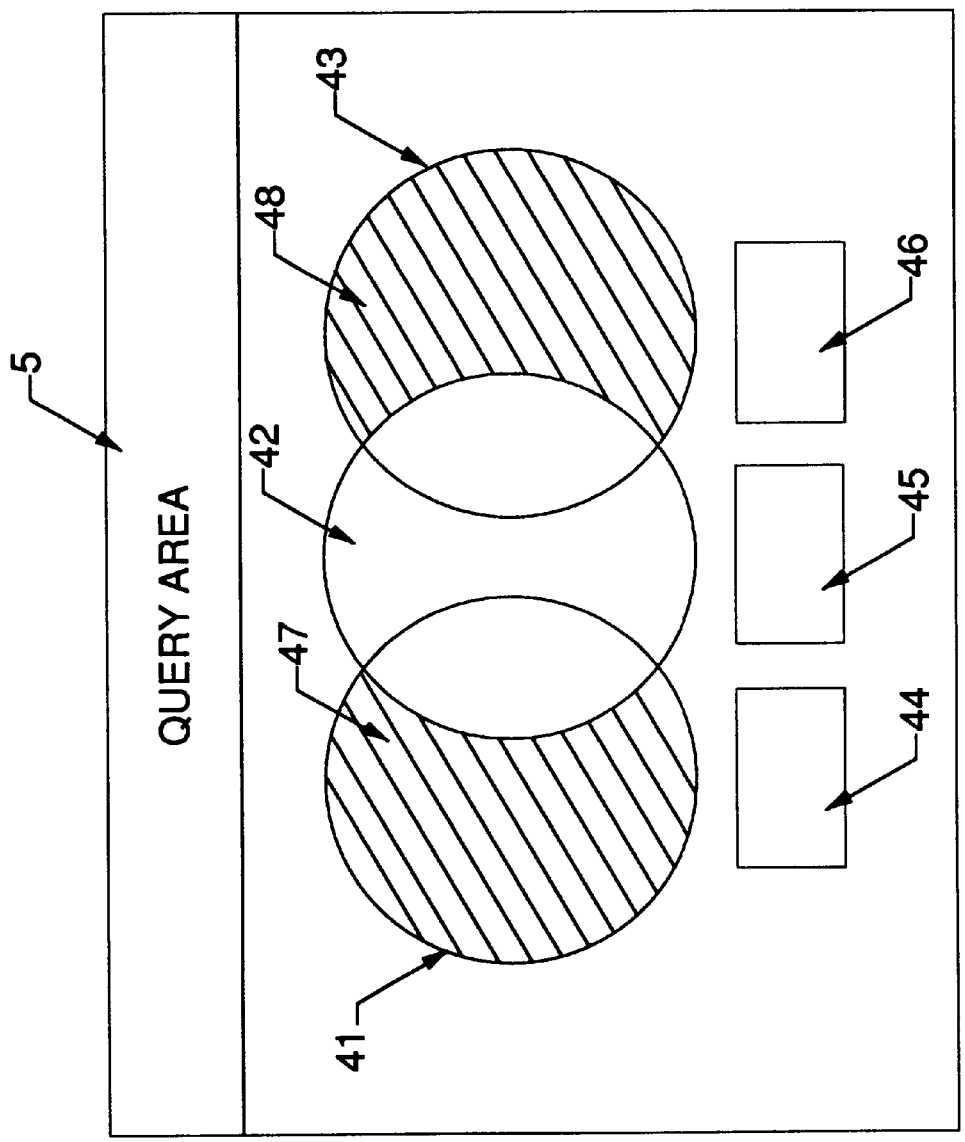
FIG. 4 is another representation of FIG. 3 with three group icons in a Venn Diagram intersecting in a particular fashion with two other selected areas illustrating the software's flexibility in file searching, in accordance with the present invention.

Referring to FIG. 4, another possible file search is demonstrated illustrating the flexibility of mathematical sets in the present application. A copy of group icons 41, 42 & 43 are dragged from various group windows into the "query area" window 5 of FIG. 1, with respective titles in boxes 44, 45 & 46. The area 47 not common to icon 42 but belonging to icon 41 is selected with the mouse on the screen and the area 48 not common to icon 42 but belonging to icon 43 is also selected by a mouse with the shift key depressed. Double clicking on either selected area would produce all files not common to 42 "and" also common to 41 & 43 in a "list of files" window 6 of FIG. 6 which appears on the monitor over the desk top window. Considering the scenario with reference to FIG. 4, whereby 41 represents a copy of "project A", 42 represents a copy of a date icon for a period, and 43 represents a copy of the "project B". By selecting the shaded areas 41 and 43 not common to area 42 and executing a file search by double clicking on either shaded area with a mouse would produce all files common to projects "A & B" outside the specified period, in a separate "list of files" window which appears on the monitor over the desk top window.

Figure 5:
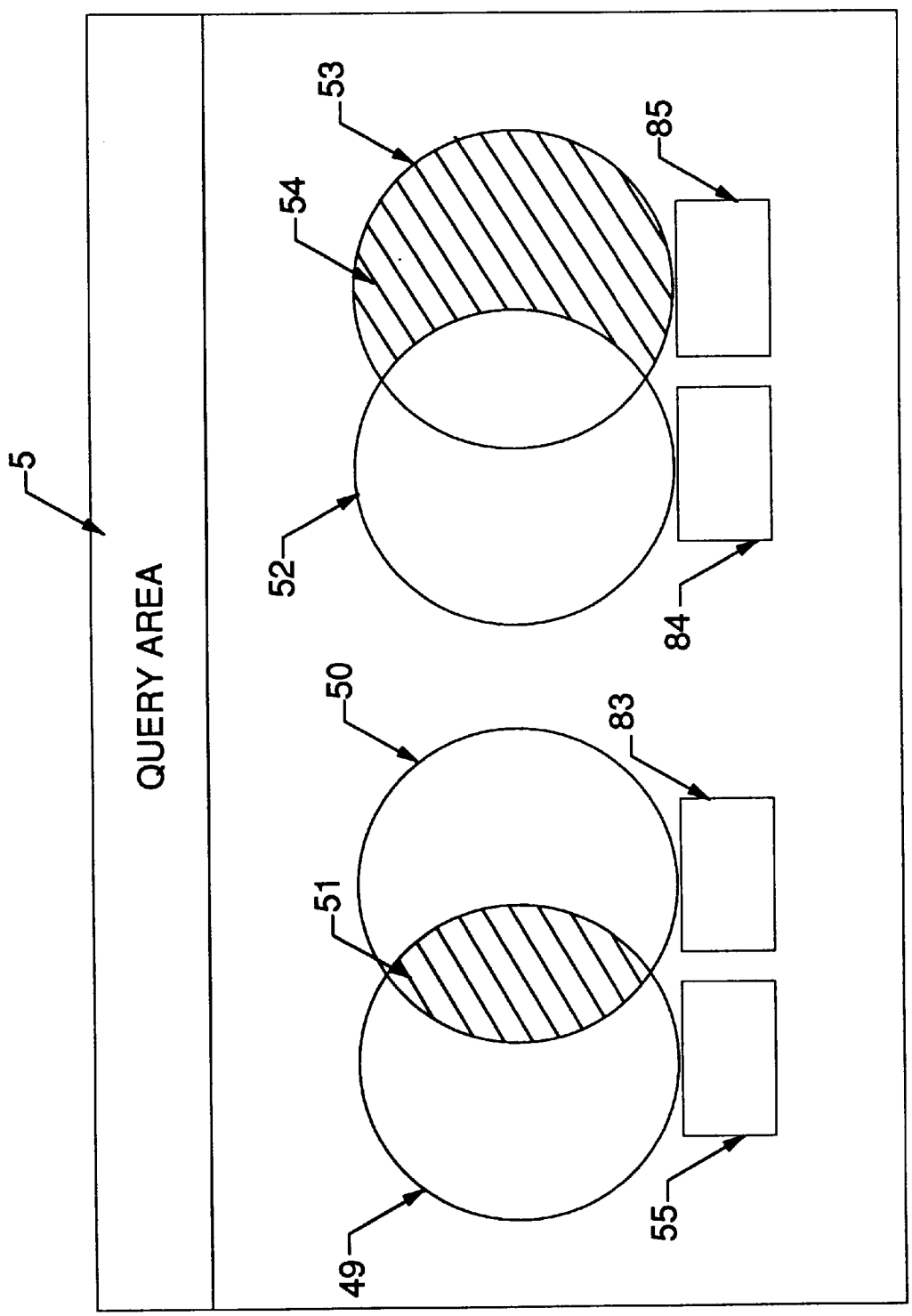
FIG. 5 is an enlarged illustration of the "query area" window of the desk top with multiple independent Venn diagrams used simultaneously in a file search further illustrating the software's flexibility in file searching, in accordance with the present invention.

Referring now to FIG. 5, common files within various group icons representing different categories can be searched. Icons from multiple group windows are selected within each group window and a copy of which dragged into the "query area" window 5 to become group icons 49, 50, 52 & 53 with respective titles in boxes 55, 83, 84 & 85. A more complicated file search is illustrated here with multiple independent Venn diagrams linked together in the same file query. With one common overlapping area 51 for group icons 49 & 50 and one exclusive area 54 to group icon 53 not common to group icon 52, it is possible to display all files queried mathematically using set theory as represented by shaded areas 51 & 54, by selecting these shaded areas one at a time with a mouse and depressing the "shift" key to select the second area, and then executing a file search by double clicking on either shaded area with a mouse, producing a "list of files" in window 6 of FIG. 6 which appears on the monitor over the desk top window. Considering the scenario with reference to FIG. 5, whereby 49 represents "project H", 50 represents "project J", 52 represents "the year 1994", and 53 represents "author K". By selecting the shaded area 51 common to icons 49 & 50 and with the "shift" key depressed, select the shaded area 54 common to 53 outside 52, then double clicking on either shaded area with a mouse or executing a menu driven file search, would produce all files common to "project H" and "project J" written by "author K" done at a time outside 1994, in a "list of files" window which appears on the monitor over the desk top window. This particular file search is illustrated to be useful in finding one letter written about two projects by the same author, which is not possible with conventional data base systems as each file has unique records with one project name and one author name but this invention allows one file to have multiple projects or authors.

Figure 6:
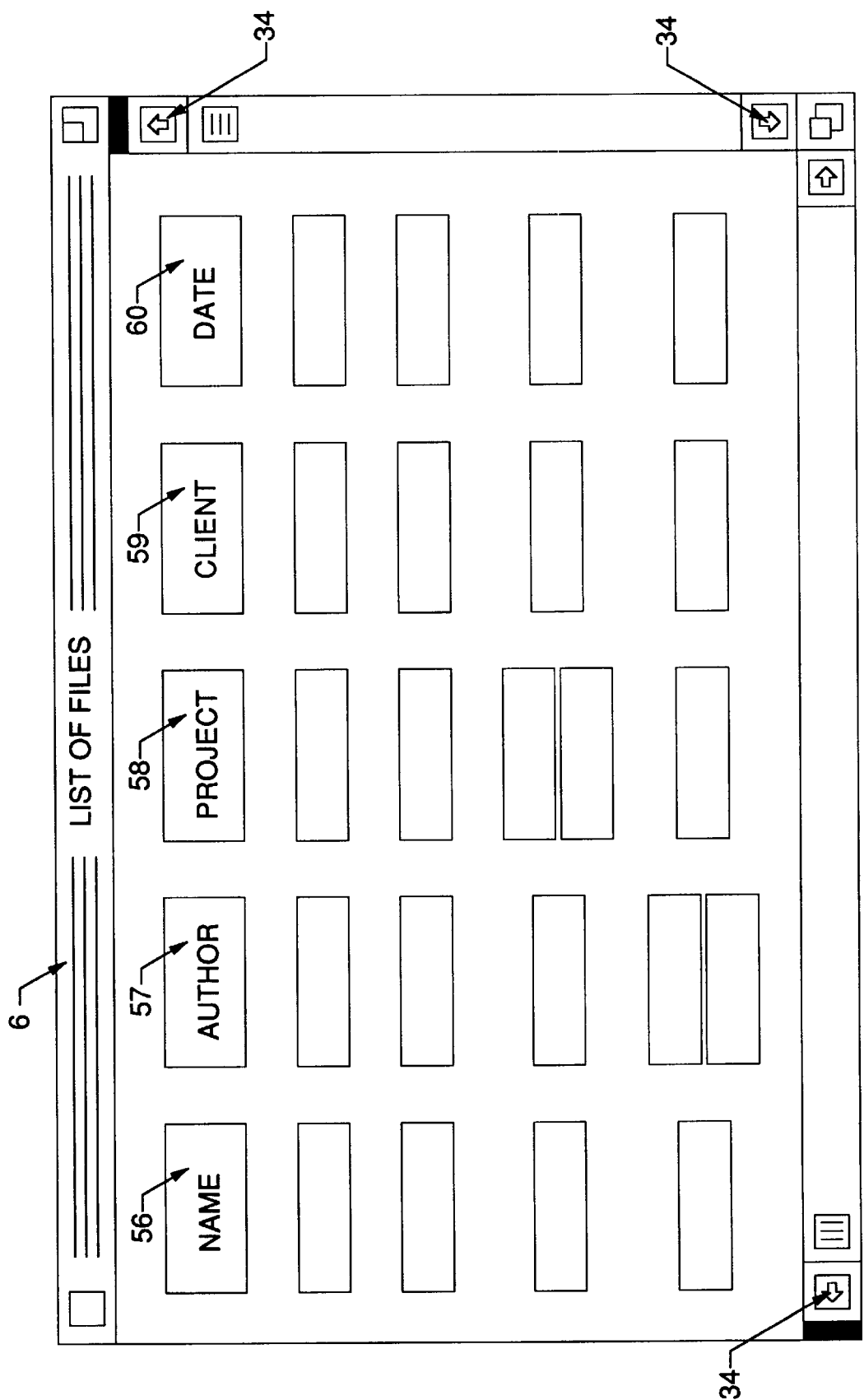
FIG. 6 illustrates the "list of files" window that appears upon executing file searches in the "query area", in accordance with the present invention.

FIG. 6 represents a clear illustration of the "list of files" window. Each line is dedicated to displaying all of the attributes that are used to identify individual files. Two files cannot be the same since at least one of their attributes are different. The titles of attributes or pictures of icons representing these attributes presented in columns such as "name" 56, "author" 57, "project" 58, "client" 59, "date" 60, "subject", etc., are displayed in this window and used in providing separate identities for individual files. These attributes are presented across each row for all files pulled up by executing a file search in the query area window. Panning through this window or the desk top window is possible using conventional methods of clicking and dragging a mouse in the direction desired, or by using the panning arrows 34 at the outskirts. It is possible to display more than one author, project, client, etc., for each file name where appropriate across each row. Application programs run as usual, but upon executing specific command functions as "save", "save as", or "open file", the data base window of FIG. 1 appears on the screen, or by accessing the main operating system's desk top menu functions, where most attributes can be edited at this time. Again it is possible to pan through this window as with all other windows on the desk top. The list of files window display can be conveniently arranged by a menu driven sort function for any column, which means that sorting by "name" lists all file names alphabetically only for all files produced by the file search. Similarly, sorting by "date" lists all files chronologically in that column and sorting by "client" or "project" or "author" lists all files alphabetically in respective columns, one column at a time. Select options are available from the menu which present the user with useful features such as displaying all files within a certain date period, only files belonging to "author B", etc., and also the ability to view by icons associated with each attribute.

Figure 7:
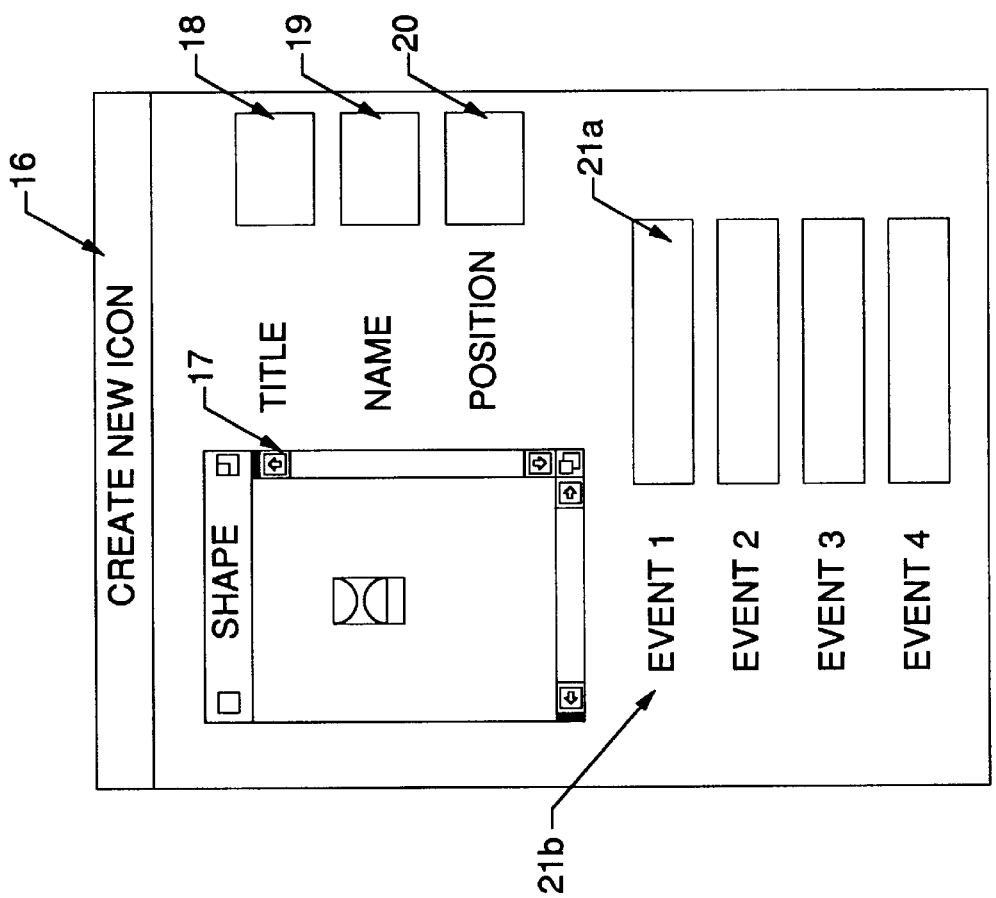
FIG. 7 illustrates the window that appears when a command is given to create a new icon, in accordance with the present invention.

Each icon in any window of the invention is actually a software object which represent topics about which each file is related. The software objects are program items and also data items or functions that are invoked when certain messages are sent to this object. The minimum configuration of an object does not have a shape associated with it but only a portion of data representing the object's name. It is possible to create a new icon to better define a discrete set of files from the main menu as illustrated in FIG. 7. For certain group windows containing many software objects, the user may desire to list these objects in the group window and not wish to have different icons associated with these objects, due to memory constraints. In this particular group window the user may desire to assign a generic icon or system icon which has the same appearance for all objects in that window. A dialogue box or window 16 appears upon selecting "create new icon" from the menu of the invention allowing the user to input parameters for this new icon. A small window 17 inside the box enables access to a library of icons to select the desired shape of the new icon. It is also possible to scan new shapes into the library to provide virtually any shape for better reference, with the ability to edit and custom design any icon. Provision is made to input the "title" 18, the "name" 19, and the "position" 20 of this new icon, from within this box. Programs 21a can be inputted which are invoked when certain events 21b occur such as "save as" or "open file" from within the application program, or when "OK" is invoked after selecting certain icons which represent a certain file.

The previous description of an icon is a software object which is a collection of data and programs. This software object is represented most of the time on the computer's monitor by an icon and a name under the icon. In a minimum configuration, this software object can also be represented on the monitor as just the name of the software object. This name or the name and the icon above it represents to the user a topic which is useful in finding a particular file. This topic represented on the monitor by the icon and its assigned name is meant to remind the user of some aspect of the related file in search of. It is similar to how the human mind associates certain objects with other objects closely related to it. Icons on the desk top are intended to remind the user through a graphical approach of certain aspects of a particular file for which many attributes are forgotten. The sight of the icon alone is intended to provoke a memory response from the user pertaining to the queried file.

Figure 8:
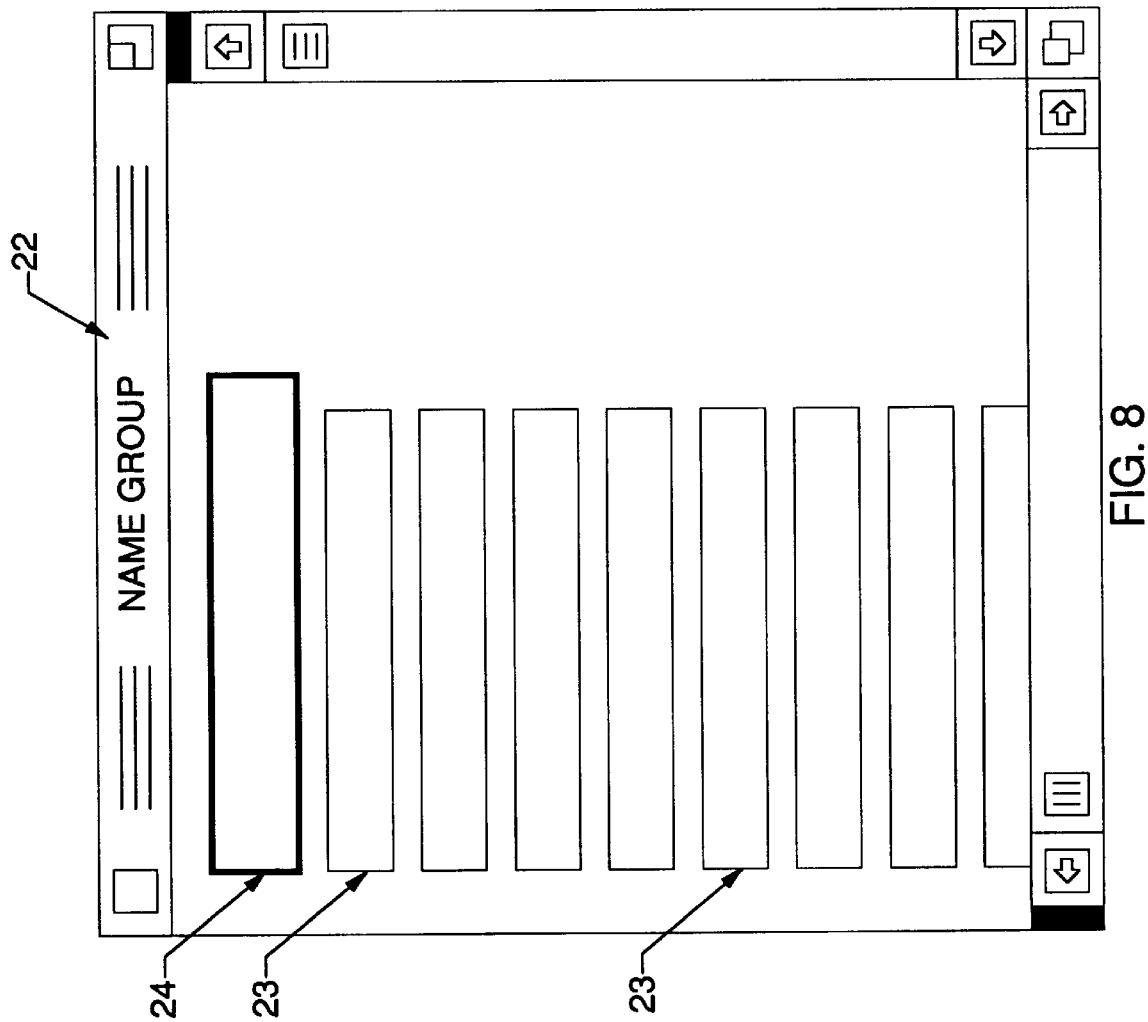
FIG. 8 illustrates the "name group" window that appears inside the data base window upon executing a "save" command in an application program, in accordance with the present invention.

Inside each group window need not necessarily contain icons themselves but only a listing of the names of these icons or objects especially when there is a large quantity. One such group window in which it is advantageous to show the names of all files and not icon names is the "name group". FIG. 8 represents an enlarged illustration of the "name group" window 22 which displays a listing of all file names 23, and only for this "name group" the names of the icons are the same as the file names. The name of a file is just another attribute that is linked to the file and normally each name refers to a separate file. Other group windows exist such as "authors", in which the names of the authors are not necessarily the names of the files that they are linked to, as any author can be linked to many files. Names of each file could also represent several versions of the same file, hence several files can have the same name but different versions. A generic icon exists which has no shape but only a name and represents a software object which does not respond to any events 21b of FIG. 7. Almost all objects in the name group are represented by generic icons which do not respond to any events. However, all objects can represented by their names within the name group window containing a listing of such names. To input a new name, the user may select "create new icon" from the menu and input the name of the new file without inputting any programs in 21a, and not assign a shape to the icon. Hence, a new object is created which is linked to a file and only be represented by a character string inside the "name group" window. This is quite a lengthy process which may not be liked by many a user, and for this reason a new object is invented called "the new generating name icon" which uses the same structure as previous objects, but responds to certain events.

In the "name group" lies this sophisticated object called the "new generating name" icon which responds to one message. When a "save" command is executed from within the data base window, after selecting all attributes usually one in each group window, by clicking on the appropriate icons with a mouse and then typing a name in the space provided for the new generating name icon, that "save" message goes to this new generating name icon and the program that responds to that "save" message generates a new generic icon inside this group window and gives it the name that the user has inputted for this generic icon. Hence, the first icon at the top of this group window is the new generating name icon 24 which has no name in the blank space allotted, but allows the user to type in any desired name of the new file and then click on the various other attributes, and when "save" is invoked a message goes to this icon and the program inside this icon recognizes that "save" has occurred and it generates a new generic icon with the inputted name, and places it with the other generic icons 23 below, removing the last typed name and leaving that space blank as before. Each icon has a name attached to it and can be edited by using a mouse. All listings of files can be arranged in alphabetical order, reverse alphabetical order, numeric order, chronologically, by size, and other useful representations. The reason why all the names are not shown with separate icons is because the user should not spend extra time selecting a different shape for various icons, and the name of a file does not necessarily need an icon to distinguish it from other file names. This new generating icon is similar to the user creating a new icon and changing its name to the desired file name. Useful queries can be performed with the file names listed in various formats. Consider the file search for a particular file beginning with the letter "a" written by "author B". By alphabetically listing all file names in the "name" group window and selecting all files beginning with the letter "a" with a mouse and dragging them into the "query area" window, turns them into a single group icon representing all files belonging with "a". Dragging the icon "author B" from the "author" group window into the "query area" window and overlapping with the previously mentioned group icon, then double clicking on the overlapping area would produce all files beginning with the letter "a" written by "author B", from which the user can extract the desired file.

Figure 9:
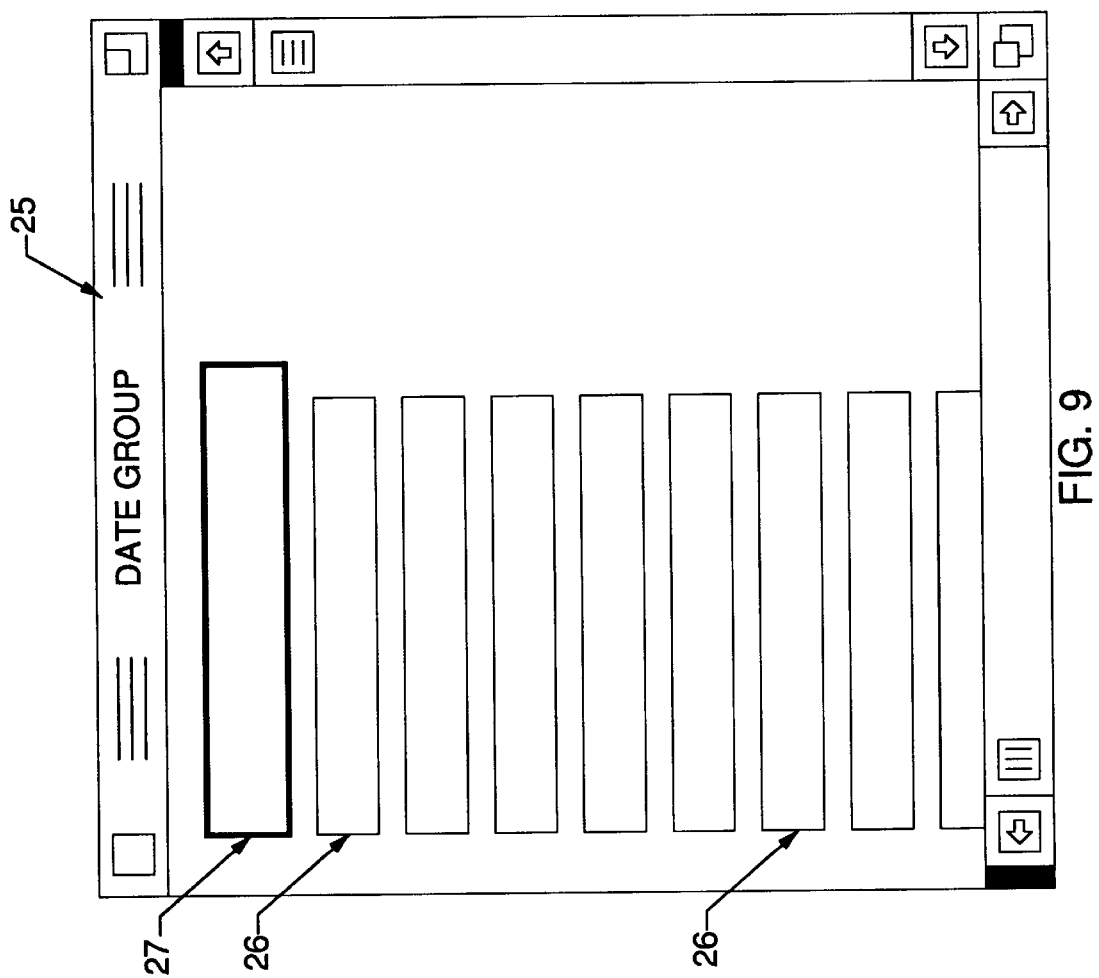
FIG. 9 illustrates the "date group" window that appears inside the data base window upon executing a "save" command in an application program, in accordance with the present invention.

FIG. 9 represents an enlarged illustration of the "date group" window 25 which may be present in the data base window of FIG. 1. In the "date group" lies a software object called the "new generating date" icon which is a standard object with more code in it that acts and responds similar to the "new generating name" icon, but this icon extracts the computer's clock date when "save" is executed from within the application program, and automatically inputs it in a dedicated space which can be edited at any time, and also spawns a new icon into the "date group" window with this new selected date. The first icon at the top of this group window is the new generating date icon 27 which has no date in the space allotted, but allows the user to type in any desired date for the new file, or defaults to the computer's clock date, and then by clicking on the various other attributes, when "save" is invoked a message goes to this icon and the program inside this icon recognizes that "save" has occurred and it generates a new generic icon with the inputted date, and places it with the other generic icons 26 below, removing the last typed date and leaving that space blank as before. Each icon has a date attached to it and can be edited by using a mouse. One of the preferred embodiments of the "date group" is a listing of the date and time of each file when last saved, where all listings of files can be arranged in alphabetical order, reverse alphabetical order, numeric order, chronologically, size, and other useful representations. Normally, there is only one file associated with a particular date and time as it very rare to have more than one file last saved at the exact date and time. Hence, each item in the date group is linked to separate file. The "date group" is similar to the "name group", and the user can dictate whether the objects inside these groups have icons. The "new generating date" icon can be more sophisticated to respond to a message when "save as" is invoked inside the application program. When "save as" is invoked inside the application program, the data base window of FIG. 1 appears on the screen and this event of invoking "save as" sends a message to the new generating date icon 27 in the "date" group, which extracts the computer's clock date and inputs it into the blank space of 27 at the top of the "date" group. Upon executing "save" or "OK" from inside the data base window of FIG. 1 the new icon is generated and placed with the others 26 below, and "new generating date" icon 27 reverts to a blank space once again, without the need to enter the date in the "date group" window. Consider the file search for a particular file during the month of Jan./'94 written by "author B". By chronologically listing all dates in the "date" group window and selecting all files during the month of Jan./'94 with a mouse and dragging them into the "query area" window, turns them into a single group icon representing all files during Jan./'94. Dragging the icon "author B" from the "author" group window into the "query area" window and overlapping with the previously mentioned group icon, then double clicking on the overlapping area would produce all files during the month of Jan./'94 written by "author B", from which the user can extract the desired file.

Figure 10:
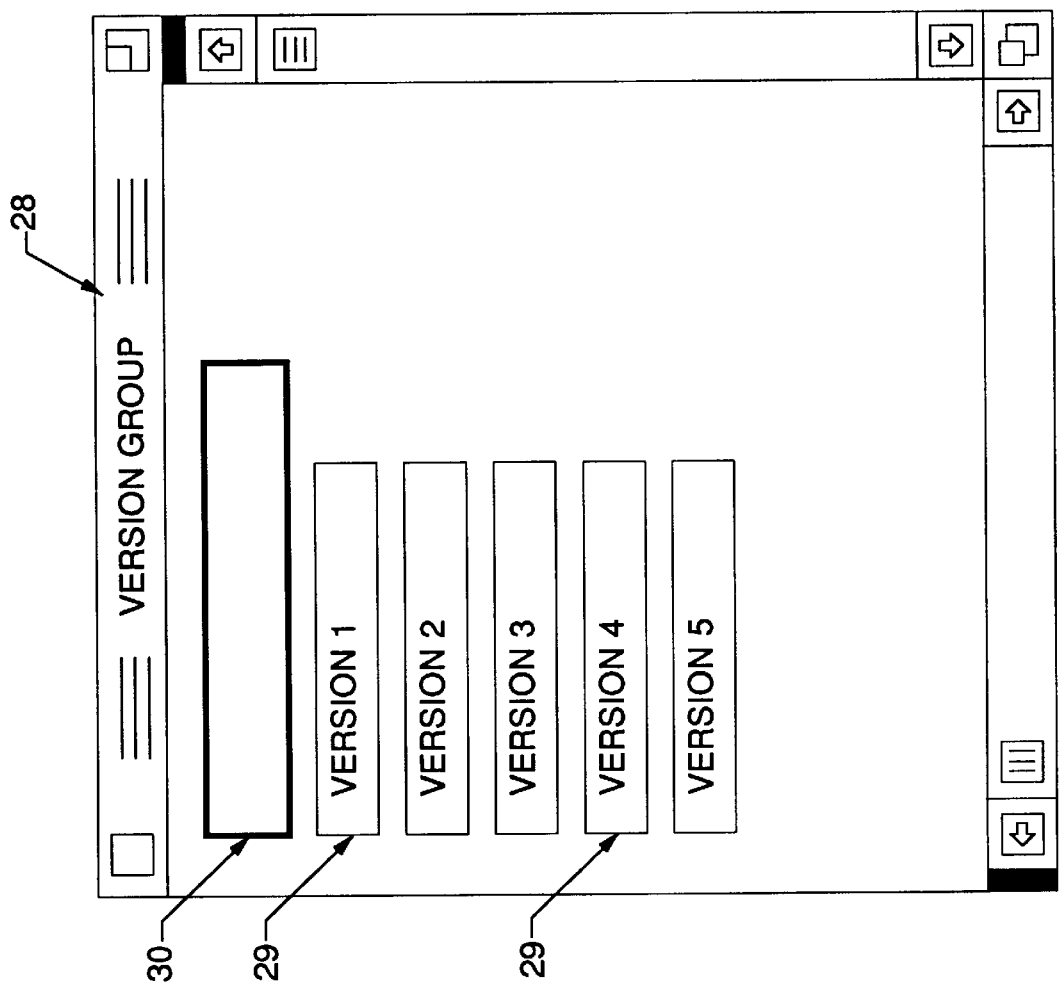
FIG. 10 illustrates the "version group" window that appears inside the data base window upon executing a "save" command in an application program, in accordance with the present invention.

FIG. 10 represents an enlarged illustration of the "version group" window 28 which may be present in the data base window of FIG. 1. A simplified representation of this window displays version numbers 1, 2, 3, 4 & 5 where each version 29 is listed in sequence. Normally, the first time a file is created there is no need to use a version number, but in instances where significant changes are required to warrant a version number tagged to a particular file, "version 1" may be clicked with the mouse and "save" is executed to save that particular file as "version 1". If "save as" is executed from inside the application program and there are no significant changes to warrant a new version number, the new file is written over the old one replacing it with the current version number if one is assigned to it, as two files can't exist with the identical attributes. When significant changes are made to any file that has been previously assigned a version number, say "version 1", all other attributes are not modified except the version which is modified from inside the "version group" window by clicking on "version 2", which has not been assigned to any file until now. The "version group" is similar to the "name group", and the user can dictate whether the objects inside this group have icons. In the "version group" lies a more sophisticated software object called the "new generating version" icon 30, which is useful to the user if a new version is desired for each time significant changes are to be saved, in which case the program function would examine the current version number and assign the next available version in sequence. If all available version numbers have already been assigned to the same file name then the new generating version icon would spawn a new version icon with the next number higher than the last assigned version and make that active and link it to the file.

Figure 11:
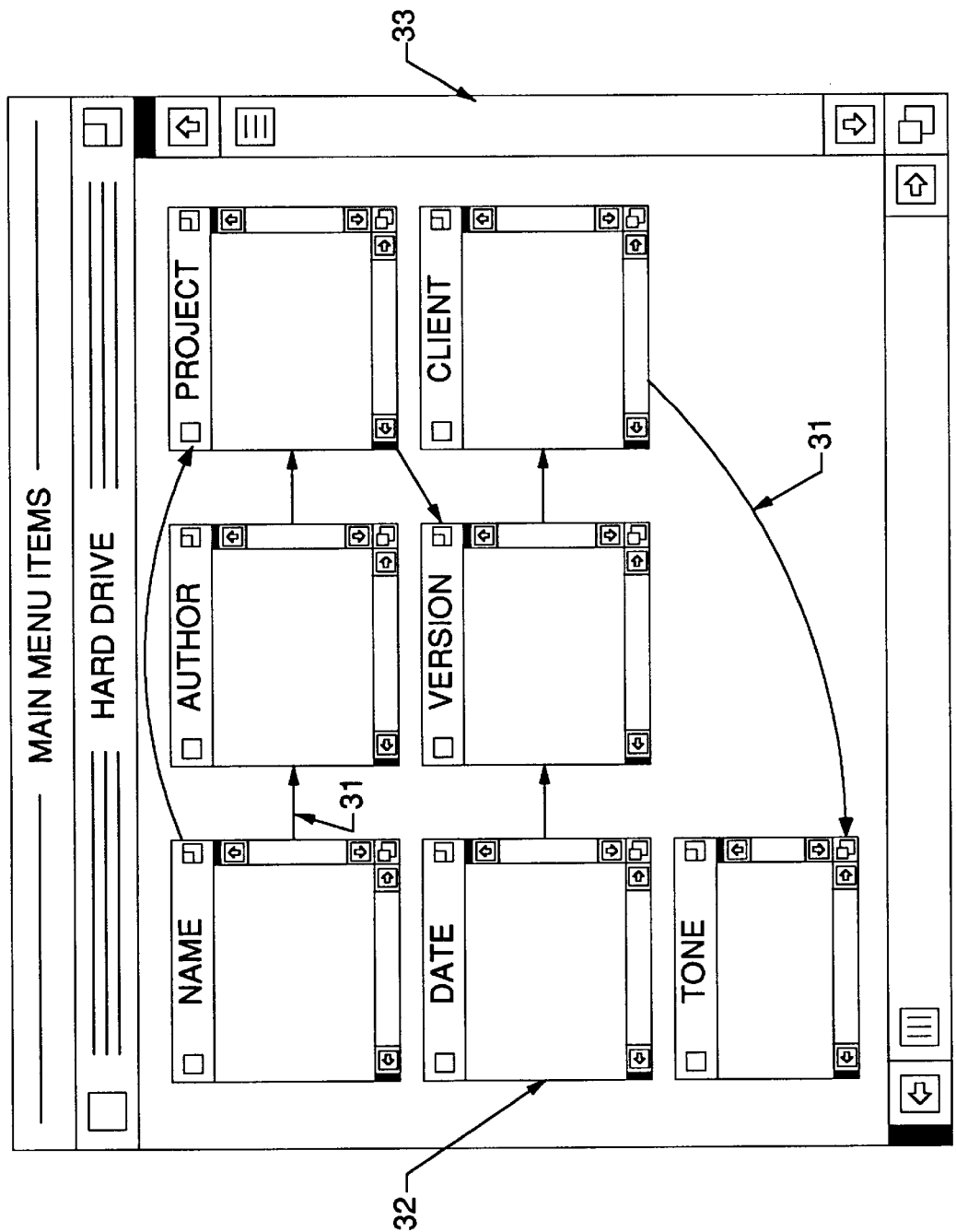
FIG. 11 illustrates the "hard link" concept of automatically linking newly saved files with icons in selected group windows, in accordance with the present invention.

In referring to FIG. 11, the "hard link" concept could be used here as a means of ensuring that one or more attributes are linked to any file and is illustrated for a better understanding. These "links" or routes 31 are set by the user to enable a pre determined chain of groups or categories 32 to be linked with any file saved, enabling a more elaborate data base system. The purpose of these hard links is to ensure that the user selects an icon form related group windows to be linked to any particular file being saved, and also for the user to develop the habit of selecting icons from various windows. Hence, when the "save", "save as" or "open" commands are executed in an application program, the data base window 33 appears reminding the user to select and link files to icons as desired, and the program does not exit until links routes are completed. Several different "hard link" routes can exist taking the user from "name" to "date" to "version", or from "name" to "author" to "project", or any other desired route comprising of any number of categories. Once a "hard link" route is started, it must be completed to the end of the set chain of categories.

Figure 12:
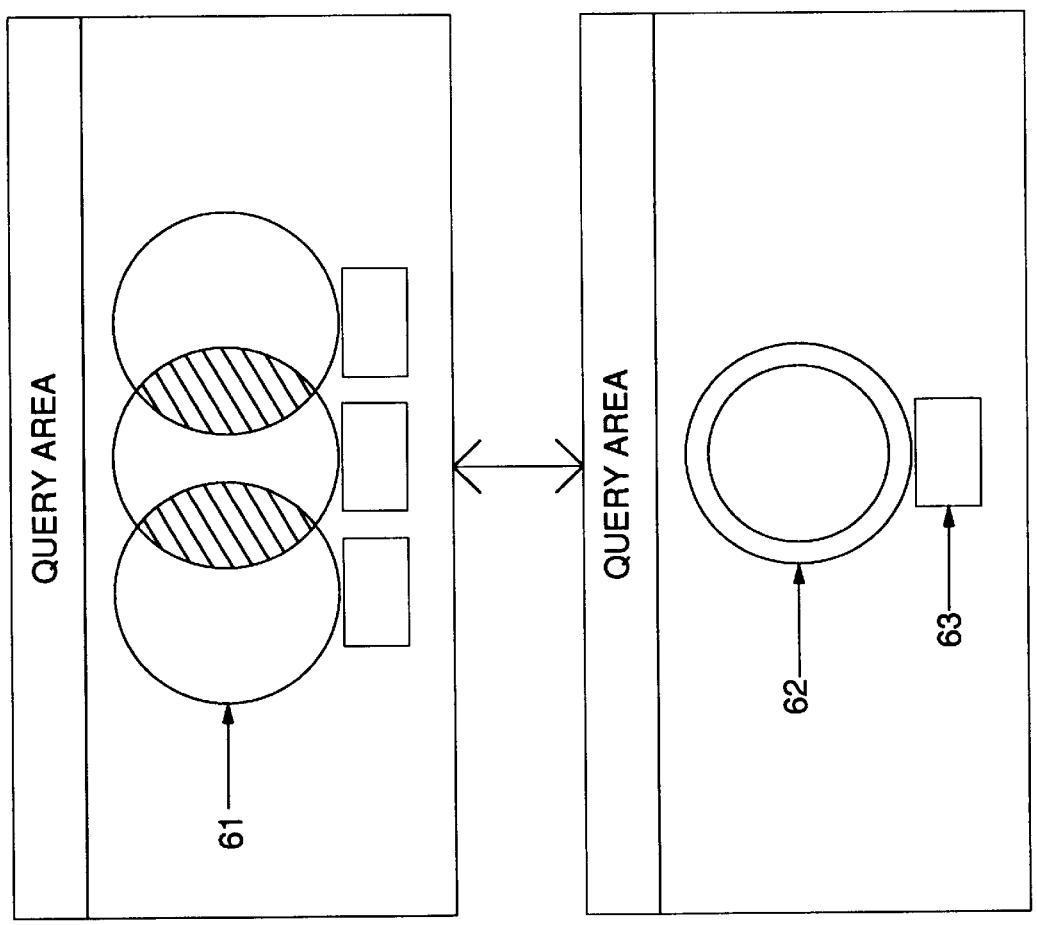
FIG. 12 illustrates the consolidation of a combination of group icons in the query area window into a single "query icon" which can be expanded to the original combination for editing and file searching, in accordance with the present invention.

The query area window of FIG. 1 can be used to store a library of file searches as further explained in FIG. 12. A copy of group icons 61 dragged from other group windows and placed in the query area window to perform various file searches, can be consolidated into a single "query icon" 62 by a menu driven command. This allows many "query icons" to be stored conveniently with an appropriate title 63 which can be edited at any time. To view group icons 61 as they overlap each other in their formation prior to consolidating, the user simply double clicks on the "query icon" and the overlapping group icons appear. Editing the file search is now possible at this time by changing the selected areas or by dragging in new icons to perform a different search. Once editing and file searching are completed, the icons can be consolidated once more for storage occupying minimal space, inside the "query area" window.

Figure 14:
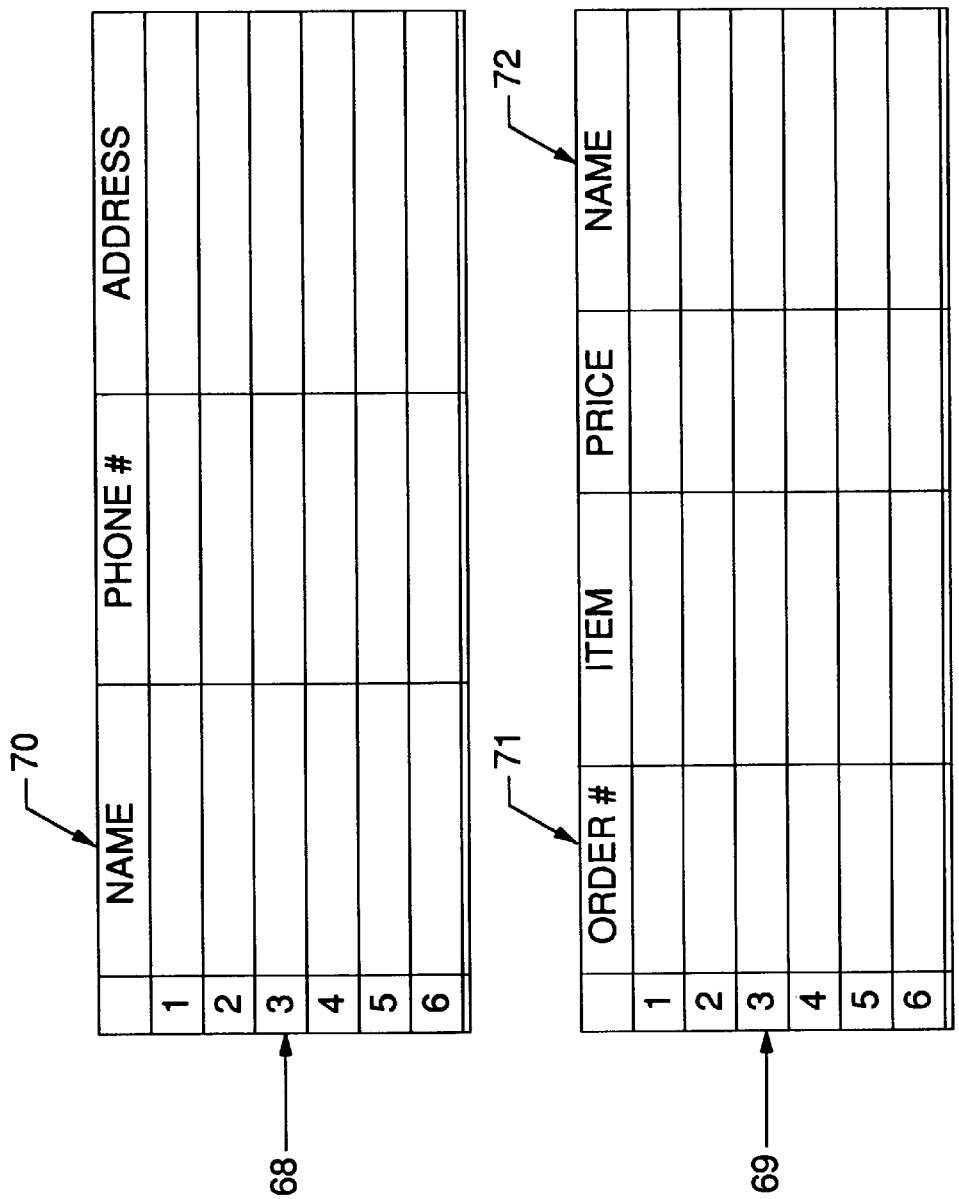
FIG. 14 illustrates conventional Data Base Management Systems linking records or files together in accordance with prior art.

Creating "customer" records 68 is usually done by conventional software Data Base Management Systems on a separate table from "order" records 69 which are linked together as demonstrated in FIG. 14. The customer records contain important data such as "customer name", "phone #", "address", etc., arranged in columns with each row per customer. The order records contain "order #", "item purchased", "price", "customer name", etc. A primary key exists which is different for each line, hence the "customer name" 70 is the primary key for the customer records 68, and the "order #" 71 is the primary key for the order records 69 as they can't be repeated. A "foreign key" can exist for any file which corresponds to a primary key of another file. Hence, the "customer name" 72 is the foreign key for the order records 69 corresponding to the "customer name" 70 of the customer records 68.

Figure 15:
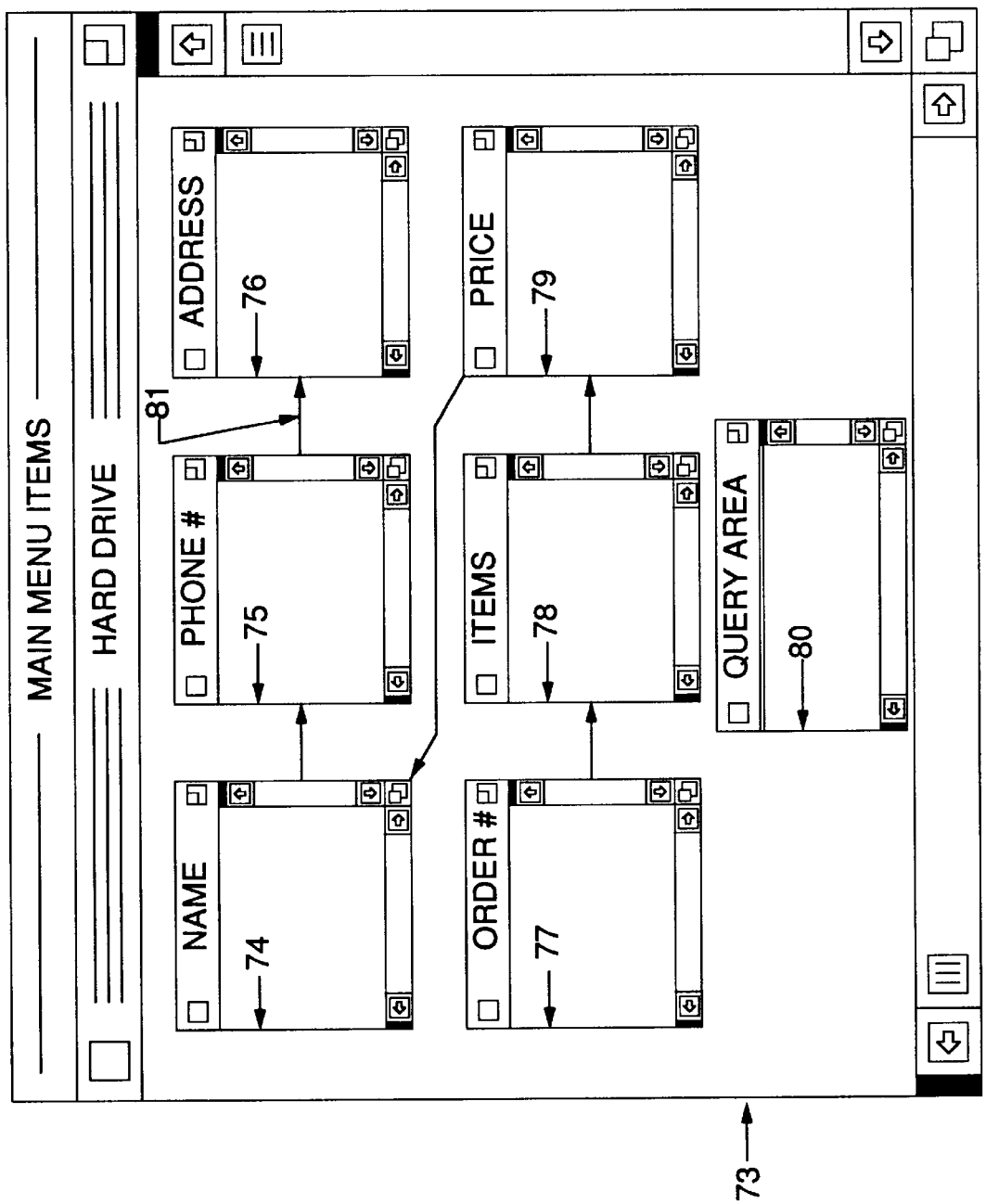
FIG. 15 illustrates the implementation of the present invention to produce a more efficient Data Base Management System than prior art of FIG. 14.
Figure 16:
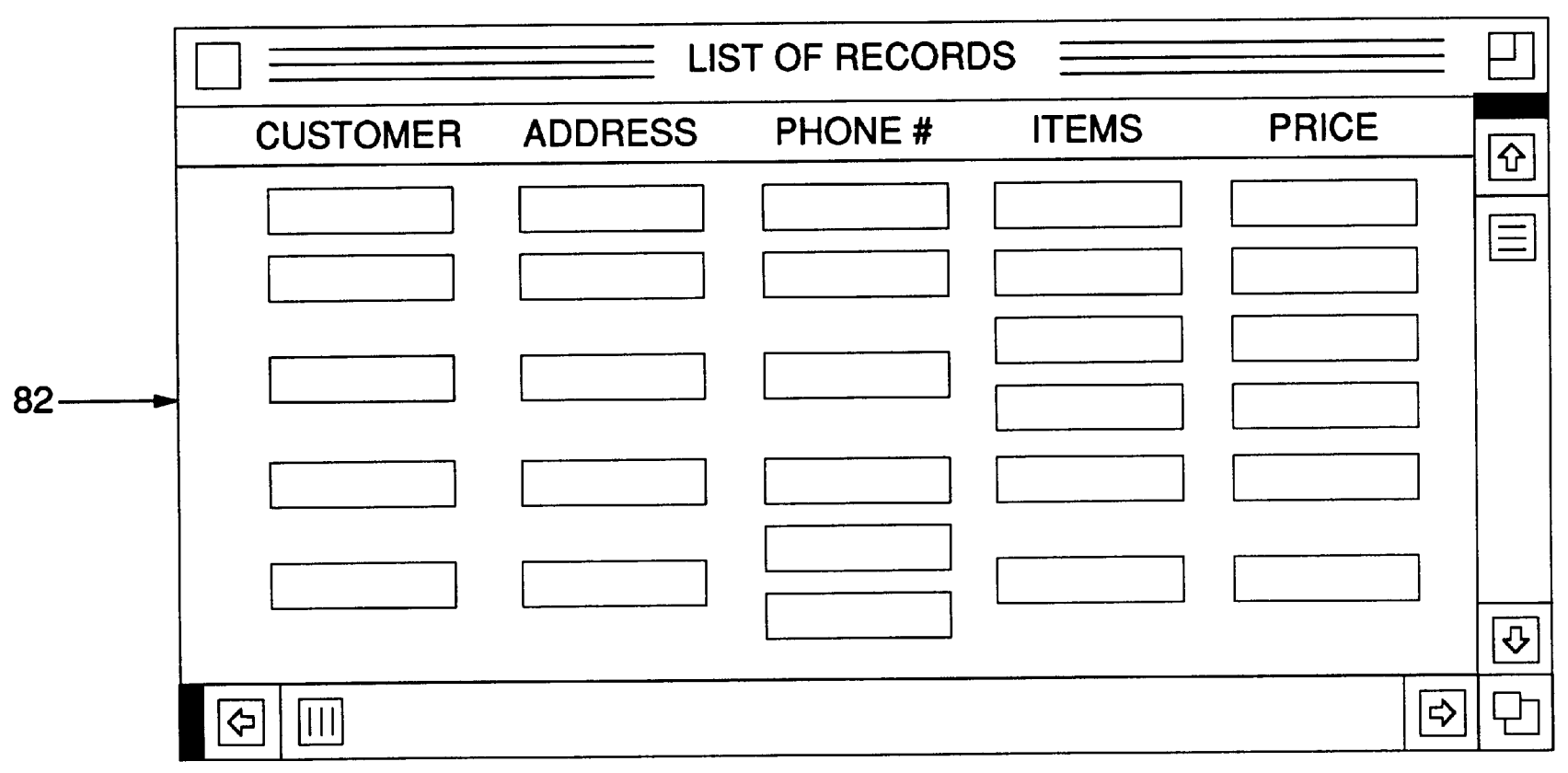

A Data Base Management System for records is accomplished with the present invention having the data base window 73 of FIG. 15, set up to display group windows of "customer name" 74, "phone #" 75, "address" 76, "order #" 77, "items purchased" 78, "price" 79, and a "query area" window 80. All records are displayed at once in organized groups with new generating icons available in the "customer name", "phone #", "address", "order #", and "price" group windows. To input a customer record, the user inputs the name in the new generating name icon in 74, the phone number in 75, and the address in 76 with the convenience of hard links 81 to ensure that all relevant information is inputted without any omissions. Each file saved is simply a node which represents a record in the data base. To enter a new order, the user sees the last order number and can input a new one in 77 or the new generating order icon can create one, the items purchased can be selected by clicking on icons in 78, the price inputted in 79 and the customer selected from the existing customer name list or a new one inputted with hard links taking the user through each group window. Selecting a past customer is done by clicking on the name from an available list inside the "customer name" group window. All records are available in the same data base window hence query searches are easily performed to find virtually any information on customer purchases. The amount that any customer purchased of any item can be easily determined by dragging the customer from the customer name group into the query area window, dragging the item's icon into the query area overlapping the customer icon, and by double clicking on the overlapping portion a list of records 82 of FIG. 16 appears with all the relevant purchases, which could be added up using menu driven spreadsheet functions. More complicated searches can be performed to determine how many items between a particular price range did a customer purchase. By selecting all prices within this range from the price group window and moving them to the query area and crossing this price group icon with the particular customer in the query area, produces these results without the need to write any specific formulas as commonly done in spreadsheets.

It is also understood that the following claims are intended to cover all of the general and specific features of the invention herein described, and all statements of the scope of the invention which, as a matter of language, might be said to fall therebetween.

I claim:

1. A method of data management that functions in collaboration with other application programs comprising:
   the steps of:
   displaying icons representing data units; and
   selecting the multiple icons to be linked; and
   linking of icons to the data units;
   icons are such that they only represent data units and icons do not represent other icons and data units do not represent other data units;
   each icon can represent multiple data units and each data unit can be represented by multiple icons.

2. A method of data management as claimed in claim 1, in which said icons are enclosed within separate group windows which represent more generalized topics about which files may related to.

3. A method of data management as claimed in claim 1, in which:

one or many icons or group of icons can overlap each other which can be used to perform various data units searches as defined graphically by a Venn diagram illustrating intersecting sets;

selecting on the intersecting areas or other areas of icons inside the query area, a data search is invoked;

multiple icons can either intersect or be placed next to each other and the resulting areas be selected to perform a combination of set operations "and" and "or" on the files for query purposes.

4. A method of data management as claimed in claim 1 such that multiple intersecting icons or group inside the query area windows can be consolidated into a single icon called a query icon which can be expanded back to its original form to be edited or find particular sets of data.

5. A method of data management as claimed in claim 1 such that: there is a second icon which responds to certain messages whereby it has no name in the blank space allotted for it, but allows the user to type in any desired name of a new data unit and when a "save" is invoked a message goes to this second icon and the program inside this second icon recognizes that this save has occurred and it generates a new icon with the inputted name and links it to the data unit.

6. A method of data management as claimed in claim 1 in which hard links may exists between group windows which take the user through a preset path of group windows for the purpose of selecting icons belonging to topics that relate to that data unit upon executing a "save" command, and this path must be completed before exiting.

7. A system of data management that functions in collaboration with other application programs comprising displaying of icons representing files wherein:

icons are such that they only represent data units and icons do not represent other icons and data units do not represent other data units;

each icon can represent multiple data units and each data unit can be represented by multiple icons; and linking of icons to the data units is done by displaying the icons on a computer screen and selecting the multiple icons to be linked.

8. A system of data management as claimed in claim 7, in which said icons are enclosed within separate group windows which represent more generalized topics about which data units may be related to.

9. A method of data management as claimed in claim 7, in which:

one or many icons or group of icons can overlap each other which can be used to perform various data units searches as defined graphically by a Venn diagram illustrating intersecting sets.

10. A system of data management as claimed in claim 7 such that multiple intersecting icons or group inside the query area windows can be consolidated into a single icon called a query icon which can be expanded back to its original form to be edited or find particular sets of data.

11. A system of data management as claimed in claim 7 such that: there is a second icon which responds to certain messages whereby it has no name in the blank space allotted for it, but allows the user to type in any desired name of a new data unit and when a "save" is invoked a message goes to this second icon and the program inside this second icon recognizes that this save has occurred and it generates a new icon with the inputted name and links it to the data unit.

12. A system of data management as claimed in claim 7 in which hard links may exist between group windows which take the user through a preset path of group windows for the purpose of selecting icons belonging to topics that relate to that data unit upon executing a "save" command, and this path must be completed before exiting.

13. A computer readable medium encoded with a computer program that functions in collaboration with other application programs comprising:

the steps of:
displaying icons representing data units; and
selecting the multiple icons to be linked; and
linking of icons to the data units;

icons are such that they only represent data units and icons do not represent other icons and data units do not represent other data units;

each icon can represent multiple data units and each data unit can be represented by multiple icons.

14. A computer readable medium encoded with a computer program as claimed in claim 13, in which said icons are enclosed within separate group windows which represent more generalized topics about which data units may be related to.

15. A computer readable medium encoded with a computer program as claimed in claim 13, in which:

one or many icons or group of icons can overlap each other which can be used to perform various data unit searches as defined graphically by a Venn diagram illustrating intersecting sets.

16. A computer readable medium encoded with a computer program as claimed in claim 13 such that multiple intersecting icons or group inside the query area windows can be consolidated into a single icon called a query icon which can be expanded back to its original form to be edited or find particular sets of data.

17. A computer readable medium encoded with a computer program as claimed in claim 13 such that: there is a second icon which responds to certain messages whereby it has no name in the blank space allotted for it, but allows the user to type in any desired name of a new data unit and when a "save" is invoked a message goes to this second icon and the program inside this second icon recognizes that this save has occurred and it generates a new icon with the inputted name and links it to the data unit.

18. A computer readable medium encoded with a computer program as claimed in claim 13 in which hard links may exists between group windows which take the user through a preset path of group windows for the purpose of selecting icons belonging to topics that relate to that data unit upon executing a "save" command, and this path must be completed before exiting.

* * * * *